United States Patent [19]

Parker

[11] Patent Number: 5,524,145
[45] Date of Patent: Jun. 4, 1996

[54] INCOMING CALL COMPLETION THRESHOLD RESTRICTION

[75] Inventor: Alita M. Parker, Lanham, Md.

[73] Assignee: Bell Atlantic Network Services, Inc., Arlington, Va.

[21] Appl. No.: 418,107

[22] Filed: Apr. 6, 1995

[51] Int. Cl.⁶ .......................... H04M 3/00; H04M 15/00; H04M 3/42; H04M 7/00

[52] U.S. Cl. .......................... 379/197; 379/112; 379/115; 379/207; 379/230

[58] Field of Search ...................................... 379/133, 134, 379/139, 140, 188, 196, 197, 198, 207, 219, 220, 221, 229, 230, 112, 113, 114, 115, 189, 199, 200, 130, 131

[56] References Cited

U.S. PATENT DOCUMENTS

| | | | |
|---|---|---|---|
| 4,935,956 | 6/1990 | Hellwarth et al. | 379/112 |
| 5,247,571 | 9/1993 | Key et al. | 379/207 |
| 5,276,444 | 1/1994 | McNair | 379/112 X |
| 5,357,564 | 10/1994 | Gupta et al. | 379/207 X |
| 5,436,957 | 7/1995 | McConnell | 379/196 |

*Primary Examiner*—Jeffery Hofsass
*Assistant Examiner*—Harry S. Hong
*Attorney, Agent, or Firm*—Lowe, Price, LeBlanc & Becker

[57] ABSTRACT

In a telephone communications system an Advanced Intelligent Network (AIN) platform is used to complete or block incoming calls to a subscriber in accordance with a threshold stored in the ISCP call processing record (CPR). The CPR contains a table of information that is customized in accordance with the options selected by the subscriber or simply may contain a threshold number that is decremented each time a call is completed. Incoming calls subsequent to decrementation to zero may be blocked, may require payment by the caller, or may be billed at a different rate. Decrementation may take place simply at a rate of one unit per completed call or at different rates in dependence upon calling area codes or locations. The CPR table may include a list of directory numbers against which individual threshold settings may be applied, while a generic threshold may be set for all other callers.

24 Claims, 6 Drawing Sheets

| CALLER INFORMATION | THRESHOLD | DECREMENT PER CALL | DECREMENT PER TIME PERIOD | RESET PERIOD | TIME LIMIT |
|---|---|---|---|---|---|
| DIRECTORY NUMBER 1 | 4 | 1 | | DAILY | |
| DIRECTORY NUMBER 2 | 1 | | 1 | DAILY | 15 MINUTES |
| DIRECTORY NUMBER 3 | 8 | 1 | 1 | MONTHLY | 15 MINUTES |
| AREA CODE 1 | 6 | 3 | 1 | MONTHLY | 15 MINUTES |
| AREA CODE 2 | 4 | 4 | | MONTHLY | |
| OTHER DISTANT AREA CODES | 10 | 2 | | MONTHLY | |
| OTHERS | 5 | 1 | | DAILY | |
| TOTAL | 50 | | | MONTHLY | |

| THRESHOLD | BLOCK/COMPLETE | RESET PERIOD |
|---|---|---|
| 10 | COMPLETE | DAILY |

FIG. 4

| THRESHOLD | BLOCK/COMPLETE | RESET PERIOD |
|---|---|---|
| 10 | BLOCK | MANUAL |

| CALLER INFORMATION | THRESHOLD | DECREMENT PER CALL | DECREMENT PER TIME PERIOD | RESET PERIOD | TIME LIMIT |
|---|---|---|---|---|---|
| DIRECTORY NUMBER 1 | 4 | 1 | | DAILY | |
| DIRECTORY NUMBER 2 | 1 | | 1 | DAILY | 15 MINUTES |
| DIRECTORY NUMBER 3 | 8 | 1 | 1 | MONTHLY | 15 MINUTES |
| AREA CODE 1 | 6 | 3 | 1 | MONTHLY | 15 MINUTES |
| AREA CODE 2 | 4 | 4 | | MONTHLY | |
| OTHER DISTANT AREA CODES | 10 | 2 | | MONTHLY | |
| OTHERS | 5 | 1 | | DAILY | |
| TOTAL | 50 | | | MONTHLY | |

FIG. 7

INCOMING CALL COMPLETION THRESHOLD RESTRICTION

TECHNICAL FIELD

The present invention relates generally to switched communications networks that include Common Channel Signaling (CCS) operation and more particularly to the use of such operation to restrict the number of calls completed to prespecified subscribers.

BACKGROUND ART

Common Channel Signaling has been utilized advantageously by the Intelligent Network of the public switched telephone system to make available an expanding array of new subscriber service features. For example, U.S. Pat. No. 5,247,571 to Kay et al. discloses the use of Advanced Intelligent Network (AIN) implementation to provide area wide Centrex service. Each central office of a network of interconnected central offices is connected to a number of local telephone lines constituting a specified group. Call routing is carried out in accord with data stored in the AIN data base and with customer specified parameters, such as calling/called party number, time-of-day, day of the week, authorization codes, etc. After the central office switching system detects an off-hook, it determines whether or not the call originates from a line subscribing to the Area Wide Centrex (AWC) service. If not an AWC line, the system receives dialed digits and executes normal call processing routines. If the call is from an AWC line, the originating office receives dialed digits, suspends the call and sends a query message to the Integrated Service Control point (ISCP) through the Signaling Transfer Points (STP's). This query message, in Transaction Capabilities Applications Protocol (TCAP) format, identifies the calling station and the digits dialed as well as other pertinent information. Based on the identity of the business group as determined from the calling party's address, the ISCP retrieves from its data base a table of trunk group routing information. The ISCP formulates a response message, again in TCAP format, including the routing information, and transmits the response message back to the originating central office via the STP(s). The system then executes normal call processing routines for completing the call using the received routing information provided by the ISCP.

For the protection of customers against outgoing call fraud, various fraud prevention arrangements, including the use of screening filters, have been developed. Entry of a PIN number, password or other identifiers has been required to eliminate or reduce the ability to use a PBX, for example, as a gateway into the interexchange network by hackers or unauthorized callers.

One such protection system is described in U.S. Pat. No. 5,357,564 to Gupta et al., which discloses a virtual communications network (VCN) within a carrier's telecommunications network. Screening filters provided in the VCN data base control the admission of calls to the network. A screening filter generator is used to process historic customer specific traffic information, together with generic information relating to fraudulent call locations and VCN design parameters, in order to generate screening filters that are stored in a screening filter data base.

U.S. Pat. No. 4,935,956, to Hellwarth et al. discloses a system that operates without the intervention of a human operator and permits billing of long distance calls to called parties. The system includes microcomputers and operates with voice prompts to the calling and called party, one of several languages being selectable by the caller. System integrity and security is provided to prevent "hackers" and disgruntled personnel from committing fraud. The system includes a memory used for instant screening and evaluation of the acceptability of the specific number being called. An outgoing call blocking capability is included to prevent routing of unauthorized calls.

U.S. Pat. No. 5,276,444 to McNair exemplifies an access authorizing system having a shared centralized security control system that interfaces between a plurality of requesters and a plurality of destinations. The security system receives requests for access to the destinations and communicates to the destinations indications of a level of access that should be granted to each calling requester by that destination on a per request basis. The security system also authenticates the requester to a predetermined level from which the level of access that is to be granted is derived and causes a direct connection to be established between the requester and the destination. Once a connection is either made or denied between a requester and the corresponding requested destination, the security system is then free to process other requests from other requesters.

Notwithstanding the relatively sophisticated and flexible centralized network call control arrangements that have been in use and exemplified by some of the above noted patents, the need exists to effect from a central network location automatic restriction of the number of incoming calls that may be completed to individual subscribers. Such provision would be particularly desirable in a customer service in which collect calls are preauthorized. The ability to set in advance a maximum number of such calls placed to an individual subscriber for a given time period, while blocking calls in excess of the set number from completion, would be a means for preventing uncontrolled toll usage by the called subscriber, thereby fulfilling a need of the telephone company to reduce its exposure to subscribers with poor credit.

The called subscriber of an automated collect call service also has a need to set limits on the total number of calls for which he or she will be billed, as well as the number of calls received from individual callers. Conventional arrangements lack flexibility in blocking incoming calls to satisfy subscriber requirements. Such requirements may include restricting the time as well as the number of incoming calls to varying degrees for particular callers to the called subscribers, so that calls in excess of specifications will be blocked.

Called subscribers may require completion of a single call after blocking a specified number of calling attempts. For example, a subscriber may want to be connected only to the tenth caller. Conventionally, each time a non-busy call is made, the caller is denied completion until the tenth such call is received. With a high volume of calls, the completed call will not be the tenth call attempt, but instead the tenth non-busy call to get through. The successful caller thus in fact is not the tenth caller. The inconvenience in manually attending to these calls, the delay in receiving the non-busy attempts, and the inaccuracy in actually completing the call to the tenth caller, are inevitable consequences of the conventional approach.

DISCLOSURE OF THE INVENTION

Accordingly, an advantage of the present invention is the ability to set, at a central network location, a threshold for the number of calls to be completed to specified subscribers.

A further advantage of the invention is that such thresholds are individualized for respective subscribers; different subscribers may have designated incoming call thresholds that are the same as or different from other subscribers, while further being afforded the ability to set different thresholds for specified callers.

Another advantage of the invention is that the thresholds are automatically reset by the network after a predetermined time period. Resetting may occur simultaneously for all subscribers for the same time intervals or individually for each subscriber as the first call to a subscriber in a new time interval is received. The invention provides the further advantage of using, in combination with the threshold feature, a timing function for each call for either limiting the length of the call or applying timed portions of the call against the threshold.

An additional feature of the invention is that the threshold may be used not only to block further calls, but also to permit connection of calls in excess of the threshold from specified callers at a different billing rate structure.

A still further advantage of the present invention is that the threshold may be used to block a set number of call attempts to a specified caller, after which the succeeding call attempt will be routed for completion.

These and other advantages of the invention are satisfied, at least in part, through the use of the Advanced Intelligent Network (AIN) Platform. A detailed description of an AIN system, suitable for implementation in connection with the present invention, is provided in the aforementioned U.S. Pat. No. 5,247,571, the disclosure of which is incorporated herein by reference.

The AIN conventionally provides services based on feature logic and data located at a centralized node in the network known as a Service Control Point (SCP) or as an Integrated Service Control Point (ISCP). Appropriately equipped switches in the network, known as Service Switching Points (SSP's), communicate with the ISCP and together they provide various AIN services. The SSP knows which calls require AIN service based on characteristics of the call, such as the line it originated from or the digits that were dialed. The process of identifying calls that require AIN processing is known as "triggering" since a particular characteristic of the call "triggers" to switch into providing AIN treatment. Once a trigger occurs, a query message is sent to the ISCP asking for instructions. Based on information contained in the query message, the ISCP determines which service is being requested and provides appropriate information such as routing and billing instructions that the SSP then executes to complete the call. Only the ISCP "knows" which service is being performed on a particular call. The SSP simply knows how to identify calls that require AIN processing and how to execute instructions provided by the ISCP.

Current program controlled switches such as the AT&T 5ESS and 1AESS and comparable switches from other manufacturers are provided with an Advanced Services Platform (ASP) that provides SSP and Network Access Point (NAP) capabilities. ASP provides services independent triggering and call processing capabilities and also supports Operations, Administration and Maintenance (OA&M). These capabilities interwork with many existing switch based features. SSP capabilities enable end offices and access tandem offices to interface with SCP databases using Common Channel Signaling 7 (CCS7) Transaction Capabilities Application Part (TCAP) protocol to implement services. These services include standard equal access multifrequency (EAMF) and CCS7-ISDN user part (ISUP) interfaces to a network access point (NAP) switch, standard CCS7-TCAP interfaces to an SCP database, call processing triggers, non-call processing triggers such as test queries, customized announcements under the control of an ISCP, such as terminating announcement or play announcement and collect digits, connection control under control of the ISCP, business and residence custom services (BRCS) interworking, new terminating restrictions, ISDN interworking, notification of call termination (returned to ISCP), enhancements for OA&M, and billing under control of the SCP. Further details are provided in AT&T 235-190-125 October, 1990.

Because the ISCP includes billing modules it can also effect the billing. The data is sent out through the ISCP so that it can either be directed to the revenue accounting office on a direct line or send a TCAP message back into the SSP or end office switch to the originating number responsible for the origination of the call. Billing can be accomplished in any desired fashion, such as in bits per second, call setup, number of packets, or any combination or the same. The billing information may go into the journal on the switch to be forwarded to the revenue accounting office.

According to the present invention the call thresholds for individual called subscribers are set in the respective caller processing records (CPRs) for those subscribers stored in the ISCP data base. Incoming calls to subscribers initiate triggers to the ISCP to access the CPRs to determine whether the calls are to be completed. Collect calls may be dialed to a generic 800 number or the like that is established for handling collect call service. For such calls, the serving office obtains the destination directory number and triggers a TCAP message to the ISCP. The ISCP is provided with the calling party Automatic Number Identification (ANI) as well as the called subscriber information.

For calls dialed directly to the destination number terminating triggers may be initiated from the end office of the called subscribers or other central offices that handle the calls. Depending on the functionality of the service, triggers may be initiated for all calls to the subscriber or for zero plus dialed calls.

The ISCP CPR is accessed in response to the trigger to determine whether the call is to be completed to the called subscriber. The CPR contains a table of information that is customized in accordance with the type of service being offered and the available options selected by the subscriber. The table simply may contain a threshold number that is decremented each time a call is completed. Incoming calls subsequent to decrementation to zero may be blocked, may require payment by the caller, or may be billed at a different rate.

Decrementation may take place simply at a rate of one unit per completed call or at different rates in dependence upon calling area codes or locations. The CPR table may include a list of directory numbers against which individual threshold settings may be applied, while a generic threshold may be set for all other callers. Thus, the service can be enhanced to apply specific thresholds and decrementation rates to calls originating from identified callers. The CPR further can be populated to combine a timing functionality with the threshold application for listed directory numbers. Calls originating from such numbers may be terminated after a specified call time interval, or the threshold for the calling directory number can be decremented further for specified call time intervals.

Thus, in accordance with the invention, calls will be completed to or blocked from the called subscriber in accordance with the threshold configuration of the service as provided for in the ISCP. For calls that are to be blocked or charged differently from calls permitted completion under the threshold, an appropriate message may be transmitted to the calling party under control of the ISCP.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

One system for providing a Common Channel Signaling Network (CCSN) utilizes Signaling System 7 (SS7) protocol in a Packet Switched Data Network (PSDN) connecting Network Elements (NE) via packet switched 56 Kb digital data circuits. In addition to providing call set signaling functions, the SS7 network also provides access to switching control points (SCP) used to permit line identification database (LIDB) look-up for 800 services. Class services also use the SS7 network to provide custom call features. The latest services using the SS7 network comprise Advanced Intelligent Network (AIN) services. AIN services use the SS7 network to access an Integrated Switching Control Point (ISCP) where AIN service functions are performed.

Figure 1:
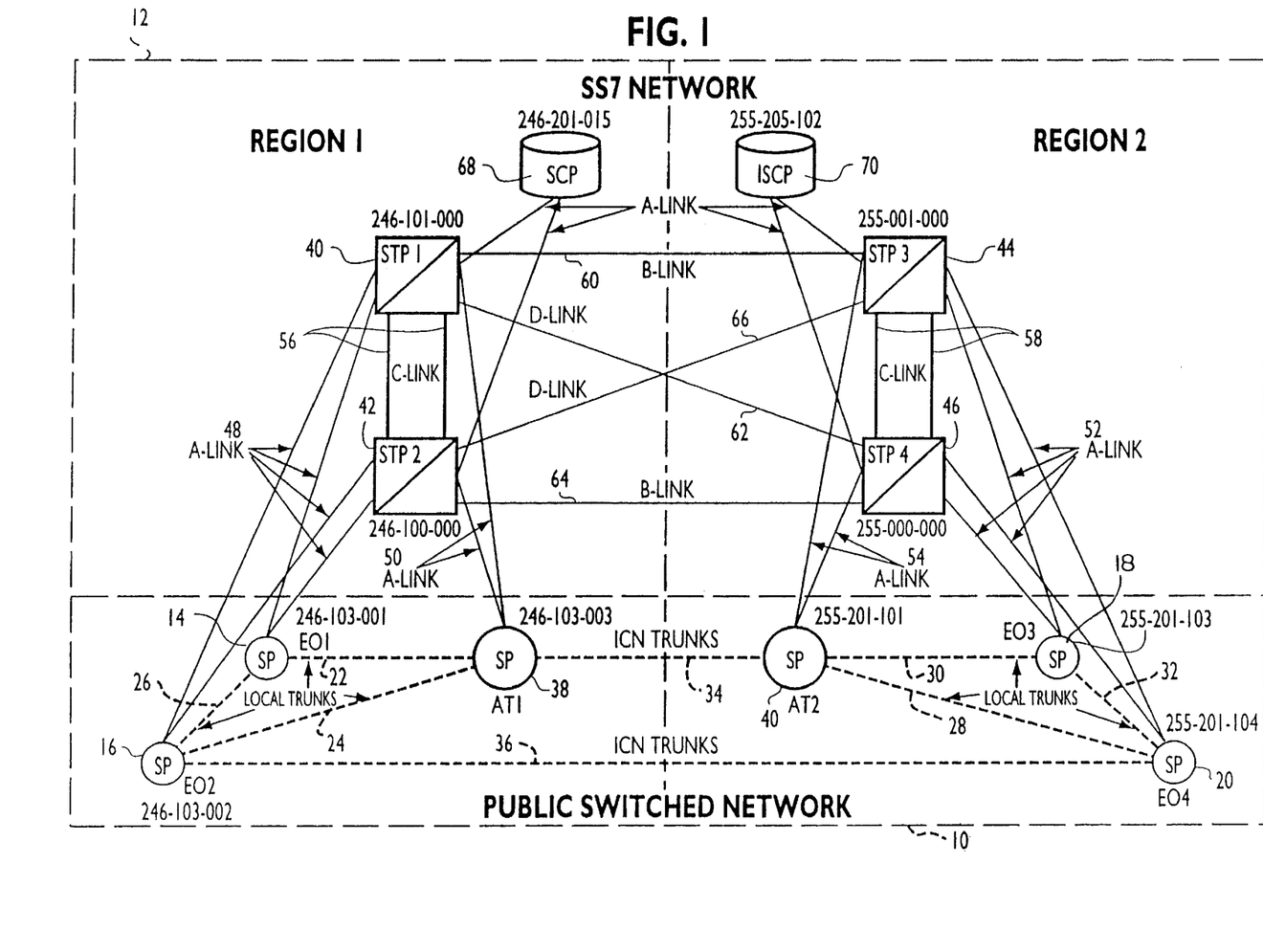
FIG. 1 is a block diagram of a Public Switched Telephone Network and its SS7 signal control network.

Referring to FIG. 1 there is shown a block diagram of a public switched telephone network and the SS7 network that is used to control the signaling for the switched network. An analog switched telephone network is generally indicated at 10 having a common channel signaling network in the form of an SS7 network illustrated generally at 12. The switched telephone network comprises a series of central offices which are conventionally referred to as signaling points (SPs) in reference to the SS7 network. Certain of these SPs comprise end offices (EOs) illustrated at 14, 16, 18 and 20 as EOs 1–4 in FIG. 1. Each signaling point has a point code comprising a 9-digit code assigned to every node in the network. In FIG. 1, EO1 has a point code of 246-103-001, EO2 has a point code of 246-103-002, EO3 has a point code of 255-201-103, and EO4 has a point code of 255-201-104.

The end offices EO1 and EO2 represent end offices in the region of one regional operating company while end offices EO3 and EO4 represent end offices of the region of a different operating company. Each operating company has its own network ID, shown here as 246 for the left region and 255 for the right region in FIG. 1. The number 103 in the designation 246-103-001, is the number of the cluster. A cluster can hold 32 SPs or members, the member being designated by the final 3 numbers. Thus 246 may represent Bell Atlantic Regional Operating Company, cluster 103, member EO2 for EO2 when viewed from an SS7 standpoint. The broken lines connecting the SPs together may be analog trunks or voice or similar circuits. The SPs in a given region are connected together by local trunks 22, 24 and 26 in the left region and 28, 30 and 32 in the right region. The SPs in one region are connected to the SPs in other regions via inter-exchange carrier network trunks or ICN trunks 34 and 36 in FIG. 1 connected to Access Tandems (ATs) 38 and 40 (AT1 and AT2). These SPs or ATs are shown as having point codes 246-103-003 and 255-201-101 respectively.

Referring to FIG. 1, the SS7 network 12 comprises a series of Signal Transfer Points (STPs) shown here at 40, 42, 44 and 46 designated STP1, STP2, STP3 and STP4. Each STP in a network is connected to the SPs in the network by A links indicated at 48, 50, 52 and 54. STP1 and STP2 constitute a mated pair of STPs connected by C links 56 while STP3 and STP4 constitute a mated pair connected by C links 58, each mated pair serving its respective transport area. It will be understood that there may be multiple mated pairs per region, one for each designated transport area. STP1 is connected to STP3 by B link 60 and to STP4 by D link 62. STP2 is connected to STP4 by B link 64 and to STP3 by D link 66.

As will be understood, the A, B, C and D links are physically identical with the designation relating to cost in terms of ease of access. The A links represent the lowest cost. B and D links have the same route cost with respect to SS7 so that the D designation is used only because it extends diagonally in the drawing. The C links are used to communicate between the two paired STPs for network management information and also constitute another route. The STPs in mated pairs have the same translations. Thus the translations in STP1 are the same as the translations in STP2, and the translations in STP3 are the same as the translations in STP4. The C links communicate between the paired STPs for network management information and SS7 message routing. The STP pair cannot function without the C links. Therefore, unnecessary utilization of the C links causes congestion and prevents the paired STPs from performing their intended function.

The STPs are connected to Signal Control Points (SCPs) indicated in FIG. 1 as an SCP 68 and an ISCP 70. The ISCP is an Integrated Signaling Control Point, which is basically the same as an SCP but comprises a larger and more powerful computer. AIN may also be regarded as another ISCP. SCPs are usually used for 800 and credit card services with ISCPs being used for AIN. However, the ISCP may hold application information as well as routing information, whereas an SCP contains routing information, i.e., routing tables.

The SS7 network constitutes a highly redundant data network, generally a 56K switched data circuit. By way of example, an SS7 message from EO2 to EO4 might travel any one of 8 possible routes. It could go from EO2 to STP1, from STP1 to STP3, STP3 to EO4. One variation on that route would be from STP1 down the D link 62 to STP4 to EO4, and so forth. In the event that a link between STP3 and EO4 were to be lost, an SS7 route could be established from EO2 to EO4 via STP1 to STP3 and then via C link 58 to STP4 to EO4. However, that would be an undesirable route in unnecessarily using the C link. A links provide direct connectivity while C links provide circuitous routes using extra switches, a situation to be avoided. An alternate route would be from STP1 via D link 62 to STP4 to EO4. Another reason for not using the C link is to avoid tying up the entire STP3–STP4 pair.

The operation of placing a call from EO2 to EO4 may be described as follows: The user at EO2 picks up his phone and dials the number that resides in EO4. The SP generates an Initial Address Message (IAM). This message would have the destination point code of EO4, namely, point code 255-201-104. It would have an originating point code of EO2, namely, 246-103-002, in addition to miscellaneous other information needed for call set-up. That message would then be sent to either STP1 or STP2. Assuming that the message goes to STP1, STP1 would look at the message and determine that the message was not for it as an STP but rather is for EO4. STP1 would then investigate possible routings to get to 255 or EO4. B and D links are available and STP1 would choose one of the two. Assuming that it chooses the B link to STP3, STP3 repeats the same procedure. It determines that the message is for 255 or EO4 and puts that message on the A link to EO4.

EO4 gets the IAM which has the called telephone number in it and determines whether or not the line is busy. If the line is not busy, EO4 generates an Address Complete Message (ACM) to indicate that it received the request for a call and that the number is not busy. That message is sent back by simply reversing the point codes. Now the destination point code is EO2 and the originating point code is EO4. The message goes back to EO2 to indicate that the IAM was received and processed. As soon as the phone is answered at EO4, EO4 sends an Answer Message (ANS) back to EO2 indicating that the phone at EO4 was picked up, and at that time the trunks are connected together. EO2 connects its user to that trunk and EO4 connects its user to that trunk so that communication is established. All such messaging may occur in about 600 milliseconds which would be average but not necessarily fast.

The foregoing constitutes the function of the STPs insofar as routing is concerned. The STPs look at a point code and if it is not for them they just pass it on via a route determined from translations and routing tables. The C link is the last route permitted and is not utilized unless no other route is available.

As opposed to the foregoing, where the point code was for EO4 and not STP1, the point code may be for STP1. One example of such a situation would be the case of an 800 call. The 800 number is a fictitious number which is associated with a POTS number in a database in the SCP. Thus if EO2 makes an 800 call to EO4 it is necessary to determine the real telephone number. EO2 launches a Switching Connection Control Park (SCCP) message, which is a database request. This point code has a destination point code of an alias which is the point code of STP1 and STP2. STP1 and STP2 have various point codes indicated in FIG. 1 as 246-100-000 and 246-101-000. They also have alias point codes that indicate that they have a function to perform. Upon recognizing such a point code the STP does a data search and generates another SCP message to perform a database dip. This returns the real telephone number and the STP now has the destination point code of the real telephone number message. This is sent back to EO2. STP1 determines that this message is for EO2 and sends it back down to EO2.

EO2 now has a real telephone number and the system performs the IAM and ACM procedure all over again to set up the call. The only difference between a regular direct call and an 800 call is the necessity to perform the dip to obtain the real number first. This procedure takes about 1.3 seconds because of the additional operation. The STPs have various databases, such as the 800 database and the credit card database, and there is still a further database for AIN.

The SS7 protocol describes how the signal messages are built and routed and provides for network management of the SS7 network itself. Thus if a link between EO4 and STP3 were to be lost, STP3 generates a transfer restricted message (TFR) to all nodes, i.e., all Sps connected to STP3, indicating that traffic is not to be sent to STP3 for EO4 because no route from STP3 to EO4 exists. If both A links to EO4 were down, EO4 would essentially be isolated and the STP pair STP3 STP4 would broadcast a transfer prohibited (TFP) message indicating that nothing should be sent to the pair for EO4.

In the transfer restricted situation it would be possible for STP3 to reach EO4 via the C link to STP4. This is a non-favored route but would be used in necessity. Handling such situations is the purpose of network managing messages. Congestion control or TFC accomplishes basically the same thing except that it constitutes a more sophisticated message limiting use of a circuit by stopping messages below a certain priority. Each message has a different priority. IAMs have a priority of 1 where ANS messages have a priority of 2.

Upon congestion occurring in the STP node for EO4 a new call could not be sent to EO4 because it constitutes a priority 1 message which is restricted because the congestion level is 2. Only priority 2 messages and higher would be permitted. If a call is already existing it could be answered or released. Releases have a priority of 2 to permit call completion. New calls could not be initiated until the congestion had been removed or lowered to congestion status 1 or 0.

The SS7 network constitutes a sophisticated network having a high predictability which is spelled out in the predetermined protocol. The SS7 messages traverse the network at all times. The messages themselves comprise digital serial messages that come into the STP. The start of the message is identified by a flag which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bits or in octets. These octets represent the information carried by the message. The message contains both fixed and variable parameters. The Message Transport Part (MTP) of the SS7 message is always in the same place. The values change but the MTP is always in the same place.

In operation, calls are placed to a subscriber by either dialing the directory number directly or dialing an indirect number, such as an 800 number for collect call treatment. The central office of the 800 number will respond to calls by obtaining the destination subscriber directory number from the caller and initiate a trigger to the ISCP. Zero plus numbers dialed directly to the subscriber are triggered by the terminating office to the ISCP. If the service will allow or block calls from completion to the destination subscriber solely on the basis of the number of calls placed, all incoming calls are used to invoke termination triggers at the destination subscriber's central office. At the ISCP the destination subscriber's CPR is accessed and the information contained therein is determinative of whether the call will be routed for completion or blocked.

Figure 2:
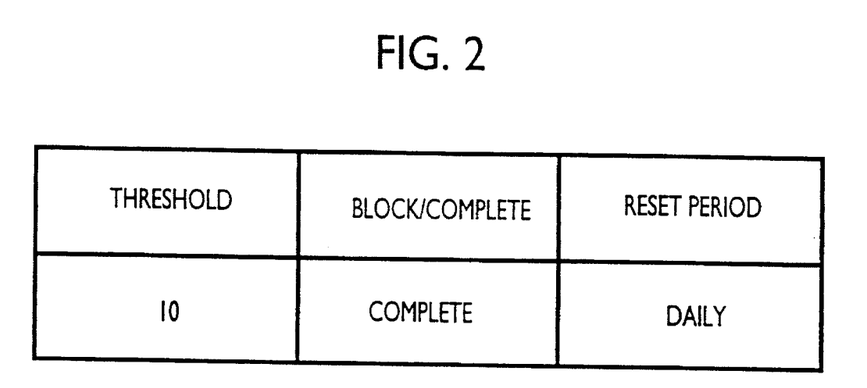
FIG. 2 is an example of a CPR table that is applicable to threshold call completion in accordance with the invention.

FIG. 2 is a representation of a CPR for a subscriber to a basic service in which an initial threshold number of calls is permitted for completion during a preset time period. Triggering to the ISCP is initiated in accordance with conditions of the service, e.g., all calls or collect calls. The threshold number applies to calls in which the ISCP is accessed. For example, if only collect calls will effect a trigger, then the threshold is applicable to only such calls.

As indicated in the figure, the subscriber is permitted a total of ten calls to be completed within a one day period. The record thus shows "10" for the threshold field, "complete" for the block/complete field, and "daily" for the reset period field. The particular designations are exemplary; the initial threshold number can be set to any level and the reset period also can be other than a daily period.

As long as the threshold exceeds zero, incoming calls will be routed for completion by application of the appropriate messaging by the ISCP. Each time an incoming call is completed the CPR threshold number will be decremented by one. If the threshold number has been decremented to zero, no further triggered incoming calls will be routed for completion by the ISCP. The ISCP may instruct an appropriate central office to transmit an explanatory message to the caller if the threshold has been exhausted. The threshold may be reset automatically at the beginning of each day or reset in response to the first call received in a new day. Automatic resetting may be performed simultaneously for all subscribers having daily reset periods.

Figure 3:
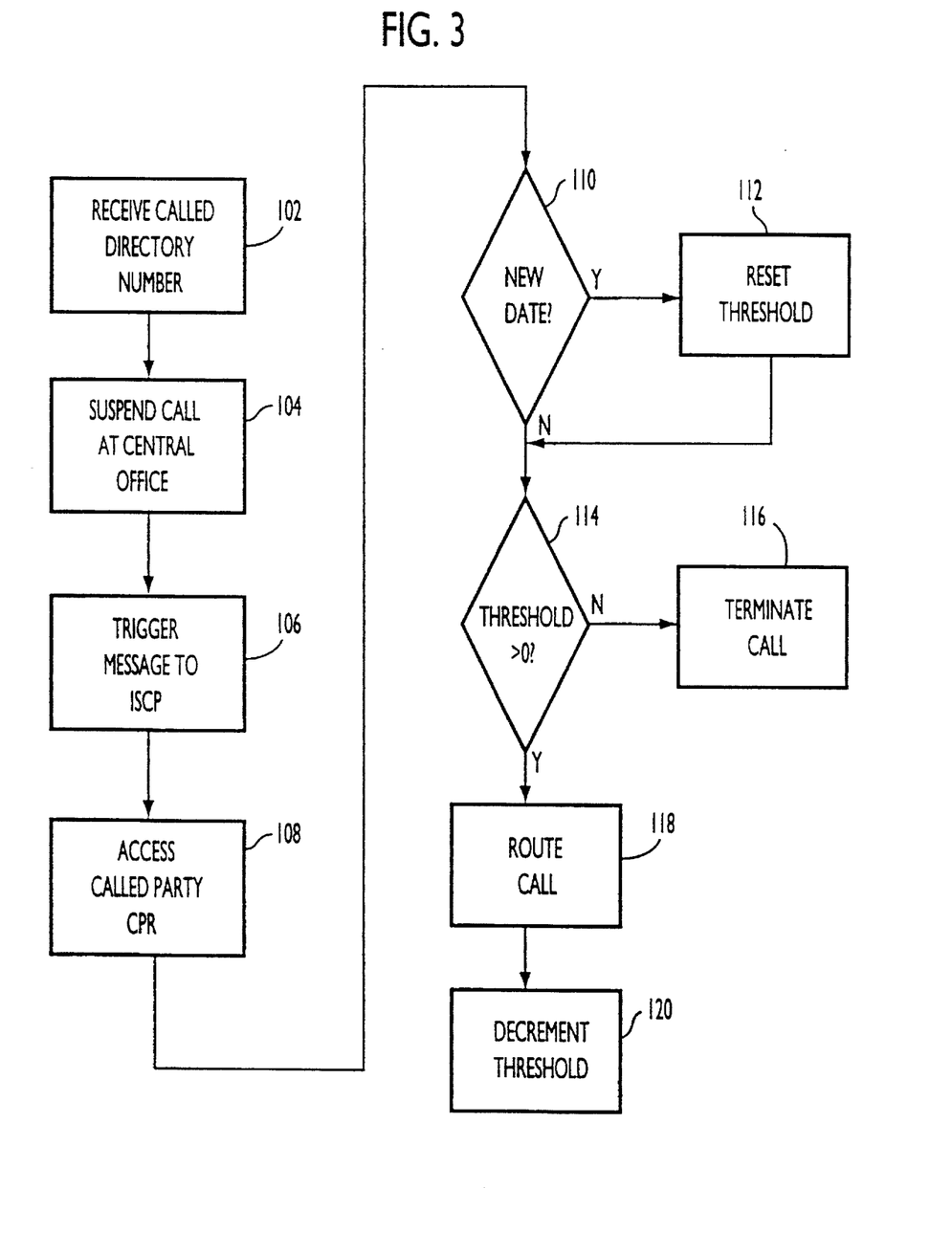
FIG. 3 is a flow chart that illustrates operation using the CPR table of FIG. 2.

FIG. 3 is a flow chart representing this operation. The called subscriber's directory number is received, at step 102, from a direct dialer or through input obtained in an automated collect call. The appropriate central office switch is set to respond to temporarily suspend the call, step 104, and trigger a message to the ISCP, step 106. The ISCP will access the CPR that corresponds to the called subscriber, step 108, and check whether the call has been placed on a day different from the last previous call, step 110. If so, the threshold number is reset, step 112. If not, the stored threshold number remains unchanged. The stored threshold number is then checked, step 114, to determined whether the initially set threshold number has been exhausted. If the current threshold number is not greater than zero, the call is terminated, step 116. An explanatory message may be transmitted to the caller. If the current threshold is greater than zero, the call will be routed for completion, step 118, and the threshold decremented by one, step 120.

Figure 4:
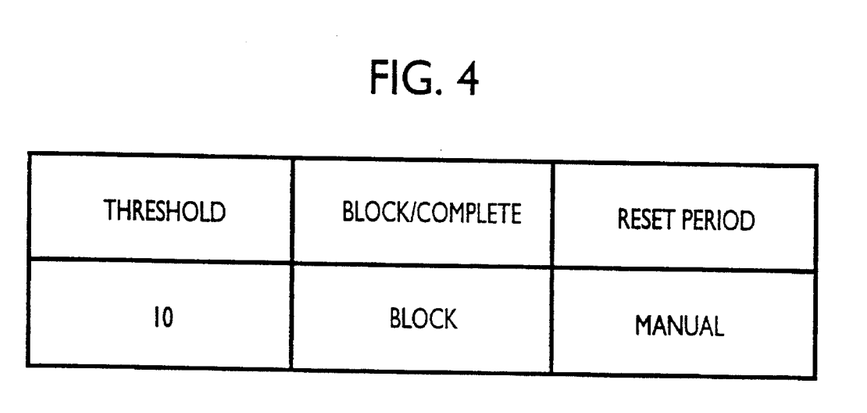
FIG. 4 is an example of a CPR table that is applicable to threshold call blocking in accordance with the invention.

FIG. 4 is a representation of a CPR for a subscriber to the service in which an initial threshold number of call attempts is to be blocked before completion of the first call. In this example, the called subscriber has required that connection be made with the eleventh caller. The record thus shows "10" for the threshold field, "block" for the block/complete field, and "manual" for the reset period field.

Figure 5:
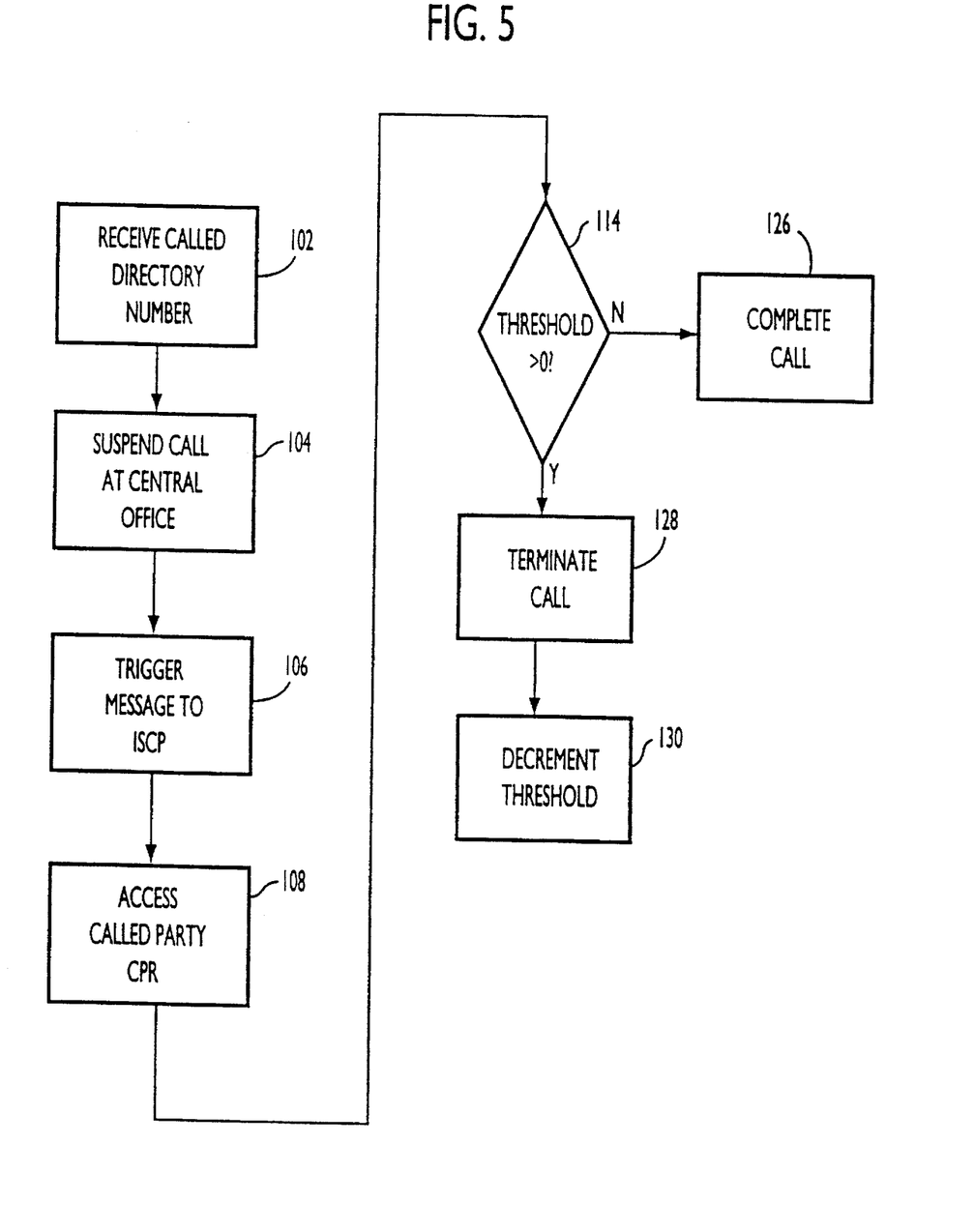
FIG. 5 is a flow chart that illustrates operation using the CPR of FIG. 4.

Operation of this service is illustrated in the flow chart of FIG. 5. Steps 102 through 108 are similar to those shown in FIG. 3 and have the same reference numerals. In these steps the called directory number is obtained and recognized by the central office to suspend the call and trigger a message to the ISCP, which accesses the called party CPR. As the subscriber determines when the service is to start blocking calls, there is no period reset checking function by the ISCP.

At step 114 the currently stored threshold is checked. If the threshold is not greater than zero, no calls are to be blocked and the call is routed for completion, step 126. If greater than zero, the threshold indicates that the call is to be blocked. The call is terminated at step 128 and the current threshold is decremented by one, step 130.

Figure 6:
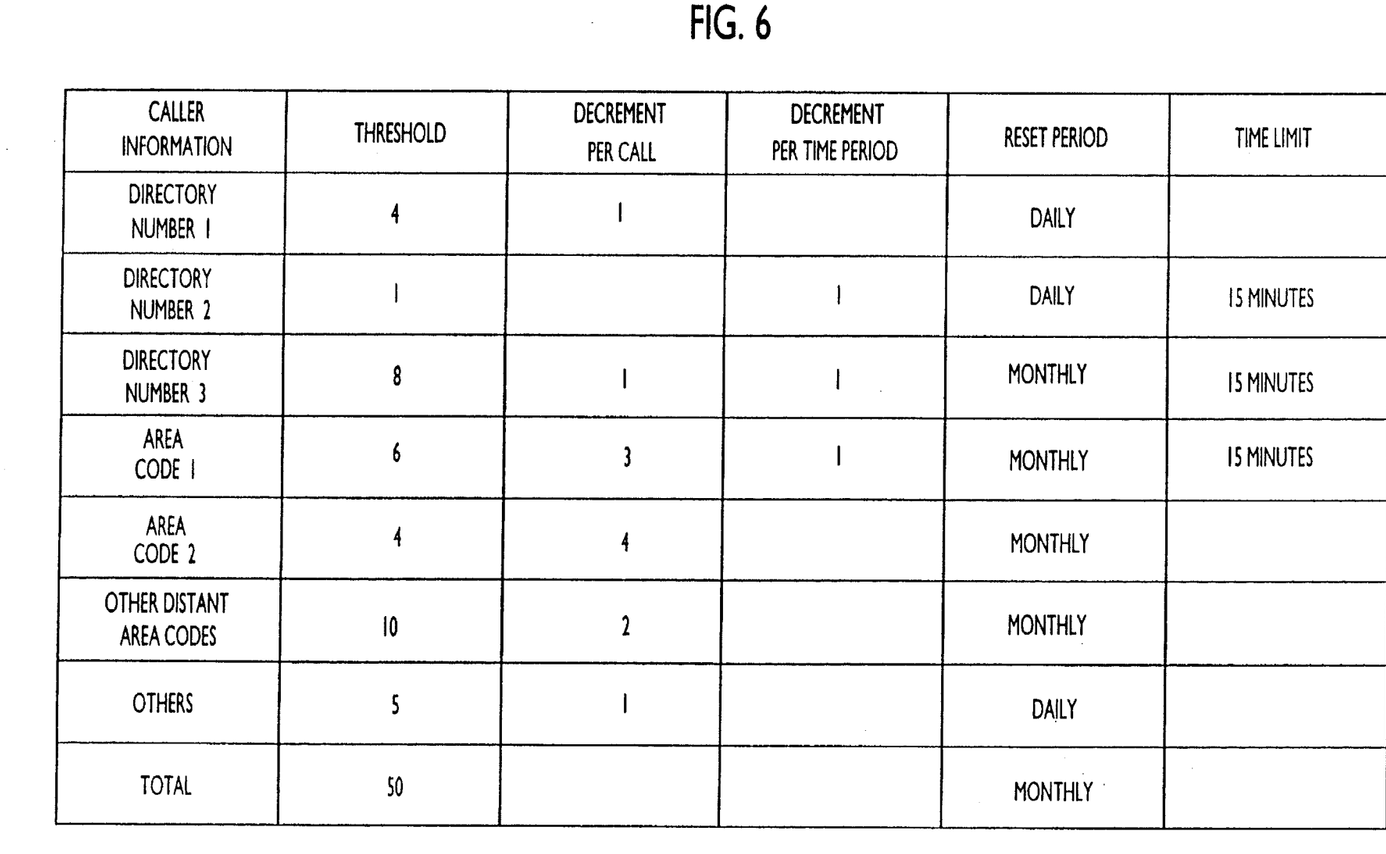
FIG. 6 is an example of a CPR table that is applicable to enhanced threshold call completion in accordance with the invention.

The CPR table of FIG. 6 includes various options available to a subscriber in an enhanced version of the call threshold completion embodiment. Several caller identification entries are associated with respective threshold treatments. An entry may represent an individual caller directory number, calls grouped from identified area codes, and other calls.

The first three entries identify specific caller directory numbers (1–3), each to be accorded the threshold amount, decrementation amount and reset period set forth in the table. These assignments are tailored to the subscriber's needs. Calls from directory number 1 are permitted to be completed to the subscriber four times per day. The caller from directory number 2, whom the subscriber has chosen to speak with for no more than fifteen minutes per day, is so limited by the CPR table. Rather than decrement the threshold number for a completed call, the fifteen minute time completion interval decrements the threshold. The ISCP may be set to terminate a call at the expiration of fifteen minutes. Calls from directory number 3 are limited to a completion threshold of eight per month, with a decrement of one for each completed call and one for each fifteen minute completion interval. Control is thus provided to limit the amount of time spent on calls to prespecified individuals.

The exemplified CPR also contains entries for calls originating from various area codes, both individually identified and grouped. The thresholds and decrements shown reflect the ability to control the number and/or length of completed calls on the basis of factors such as cost and known prospective caller identities. CPR entries also may be based on the location of the call origin. With the use of appropriate translation tables, the geographic location of the caller can be obtained. Location dependent threshold decrementation may provide a more precise control as compared to the coarse area code identification.

A default "others" entry sets a limit of five additional completed calls per day from sources not specifically addressed in the previous entries. The "total" entry permits a limit for all incoming triggered calls for a specified time period. As shown, a total of fifty decrements are permitted for the particular subscriber in each one month period. During this interval, each decrement made for any of the other entries is also made against the cumulative total decrement. When the total decrement has been exhausted, no other triggered incoming calls will be completed, regardless of the threshold existing in the corresponding entry.

Figure 7:
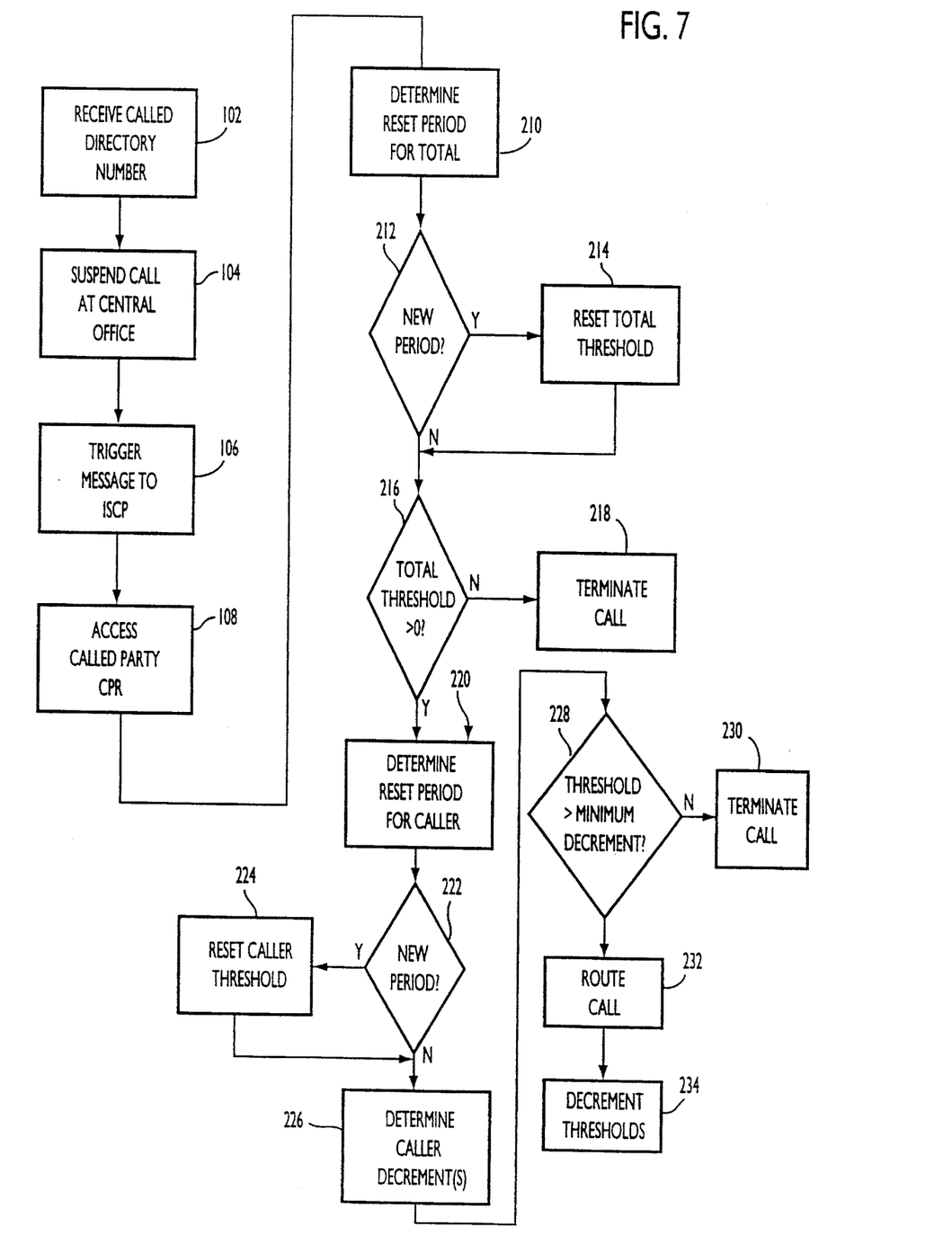
FIG. 7 is a flow chart that illustrates operation using the CPR of FIG. 6.

Operation of the embodiment of FIG. 6 is illustrated by the flow chart of FIG. 7. Upon access of the called party CPR, steps 102 through 108, the reset period for the "total" entry is determined at step 210. The date or time is checked at step 212 to determine whether the call has been placed in a new period, in this case a new month. If so, the total threshhold is reset at step 214; if not it remains unchanged. The total threshold is then checked at step 216 to determine whether it is greater than zero. If not, the call is terminated at step 218. If the total threshold is greater than zero, the reset period for the caller's entry is determined at step 220, as this period may be different from the total reset period. If a new period is found to exist at step 222, the caller's entry threshold is reset. A determination is then made at step 226 of the one or more decrement levels that may exist for the caller's entry. At step 228 the threshold of the caller's entry is checked against the decrement level to determine whether the threshold is sufficient to accommodate the minimum decrement level. If not, the call is terminated at step 230. If the threshold is found sufficient in step 228, the call is routed at step 232 and the caller entry threshold and the total threshold is decremented at step 234. If a time period decrement exists, then appropriate decrementation will occur additionally during the call.

In this disclosure there is shown and described only the preferred embodiment of the invention and but a few examples of its versatility. It is to be understood that the invention is capable of use in various other combinations and environments and is capable of changes or modifications within the scope of the inventive concept as expressed herein. For example, the ISCP can be programmed to automatically reset threshold periods by directly changing the CPR settings or by initiating calls at the beginning of periods to the subscribers to trigger period checking. Further, the timing capability of the ISCP can be used to disconnect calls that are to be limited and to disconnect calls when the a time period decrement results in exhaustion of the associated threshold. In addition, the threshold and timing functions may implement a change in the rate charged for calls that exceed threshold limitation. Thus, in prescribed situations, calls otherwise blocked under the threshold, will be routed for completion at increased billing rate.

I claim:

1. In a public switched telephone network (PSTN) having a plurality of interconnected central office switching systems serving a plurality of subscribers having respective directory numbers, a method for controlling completion of calls dialed to a destination directory number comprising the steps of:

storing an initial threshold number in a centralized network location for limiting the number of calls to be completed to the destination directory number;

decrementing the threshold number each time a call is placed to said destination directory number and dialed digit signals for the call are received by the PSTN;

determining whether the threshold number is sufficient to complete the call; and routing the call to the subscriber of said directory number if said threshold number is sufficient to complete the call.

2. A method as recited in claim 1, wherein said threshold number represents a number of calls to be blocked and said determining step comprises comparing the threshold number with zero, whereby the call will be completed if said initial threshold number has been decremented to zero.

3. A method as recited in claim 1, wherein said initial threshold number represents a number of calls allotted for completion and said determining step comprises comparing the threshold number with a decrement amount for the call, whereby the call will be completed if the threshold number is equal to or exceeds the decrement amount.

4. A method as recited in claim 3, wherein the step of decrementing comprises diminishing the threshold number by one.

5. A method as recited in claim 3, further comprising the step of periodically resetting said threshold number.

6. A method as recited in claim 3, wherein the step of decrementing comprises diminishing the threshold number by an amount that is dependent upon a predetermined parameter of the call.

7. A method as recited in claim 6, wherein said predetermined parameter is the calling subscriber directory number.

8. A method as recited in claim 6, wherein said predetermined parameter is related to the location of the calling subscriber.

9. In a communication network having a plurality of interconnected central office switching systems at different locations, each of said central office switching systems connected through a plurality of local subscriber lines to subscriber stations, and a data base remote from said central office switching systems, said data base including a plurality of call processing records associated with respective subscriber lines, a method for controlling completion of calls to said subscriber stations comprising the steps of:

storing a list of subscriber directory numbers individually in each call processing record;

assigning an initial threshold number for each subscriber directory number in the list and a generic initial threshold number in each call processing record;

for each call completed to a subscriber line, decrementing the threshold associated with the calling subscriber directory number in the call processing record of the called subscriber; and blocking call completion to a called subscriber if the threshold number associated with the calling subscriber directory number has been decremented to zero.

10. The method as recited in claim 9, wherein at least one of said call processing records contains a plurality of initial threshold numbers.

11. The method as recited in claim 9, further including the step of periodically resetting the call processing record threshold numbers.

12. In a communication network having a plurality of interconnected central office switching systems at different locations, each of said central office switching systems connected through a plurality of local subscriber lines to subscriber stations, a voice network portion comprising voice communication paths for interconnecting two of said subscriber stations through at least one of said central office switching systems, a common channel signaling network portion comprising signaling paths interconnecting said central office switching systems through at least one signal transfer point (STP) and at least one integrated services control point (ISCP) including a data base, a method for controlling completion of calls to said subscriber stations comprising the steps of:

setting an initial threshold number for limiting the number of calls to be completed to an identified subscriber line;

storing said initial threshold number at the ISCP data base;

for each call dialed to said identified subscriber line, accessing said ISCP to ascertain the stored threshold number;

determining whether said stored threshold number is sufficient to complete the call and, in response to a determination that the threshold number is sufficient, routing the call for completion and decrementing the stored threshold number at the ISCP data base if the call is completed.

13. A method as recited in claim 12, wherein said predetermined threshold number for completed calls is applicable for a prescribed time period and wherein said accessing step further includes the steps of:

determining whether said prescribed period has expired and, in response thereto, resetting the threshold number stored in the ISCP data base if a new period has occurred.

14. A method as recited in claim 13, wherein said accessing step further comprises triggering a message through said common channel signaling network to said ISCP in response to a call dialed to a generic call collect directory number.

15. A method as recited in claim 14, wherein said accessing step further comprises obtaining a destination directory number from the calling subscriber and checking whether the calling subscriber has been authorized for collect calls to the destination directory number.

16. A method as recited in claim 15, wherein said checking step comprises comparing the directory number of the calling subscriber with directory numbers listed in a call processing record for the destination directory number.

17. A method as recited in claim 13, wherein said accessing step further comprises triggering a message through said common channel signaling network to said ISCP in response to a long distance call dialed directly to a destination number and comparing the directory number of the calling subscriber with directory numbers listed in a call processing record for the destination directory number.

18. A method as recited in claim 12, wherein said decrementing step reduces the threshold number stored in said data base by an amount that is variable in dependence upon a call parameter stored in a call processing record in the ISCP data base.

19. A method as recited in claim 18, wherein the call processing record correlates threshold amounts to be decremented with locations of calling subscriber stations.

20. A method as recited in claim 18, wherein the call processing record correlates threshold amounts to be decremented with the directory numbers of calling subscriber stations.

21. A method as recited in claim 18, wherein said determining step comprises comparing the stored threshold number with the number to be decremented for the call, whereby the threshold number is found to be sufficient if it is at least equal to the number to be decremented.

22. A method as recited in claim 12, further comprising the step of automatically resetting the stored threshold at predefined intervals.

23. A method as recited in claim 22, wherein said resetting step occurs daily.

24. A method as recited in claim 12, wherein said ISCP data base comprises a plurality of call processing records for respective subscribers, wherein said setting step comprises assigning an initial threshold number to each call processing record and further comprising the step of automatically resetting the threshold numbers of a plurality of said call processing records to their respective initial threshold numbers at predefined intervals.

* * * * *